Oct. 29, 1935.  B. THURLEY  2,019,372
TOOL FOR REMOVING SLUDGE OR THE LIKE
Filed March 25, 1933
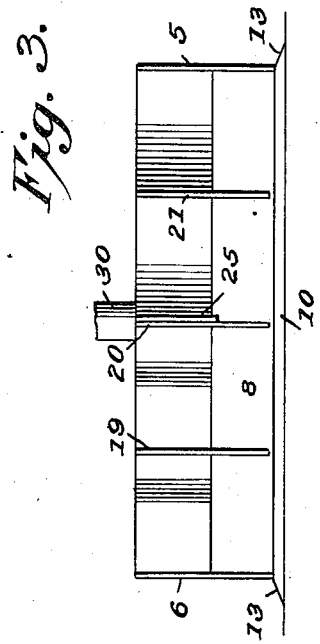
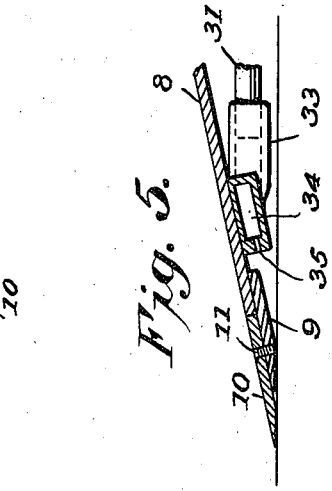
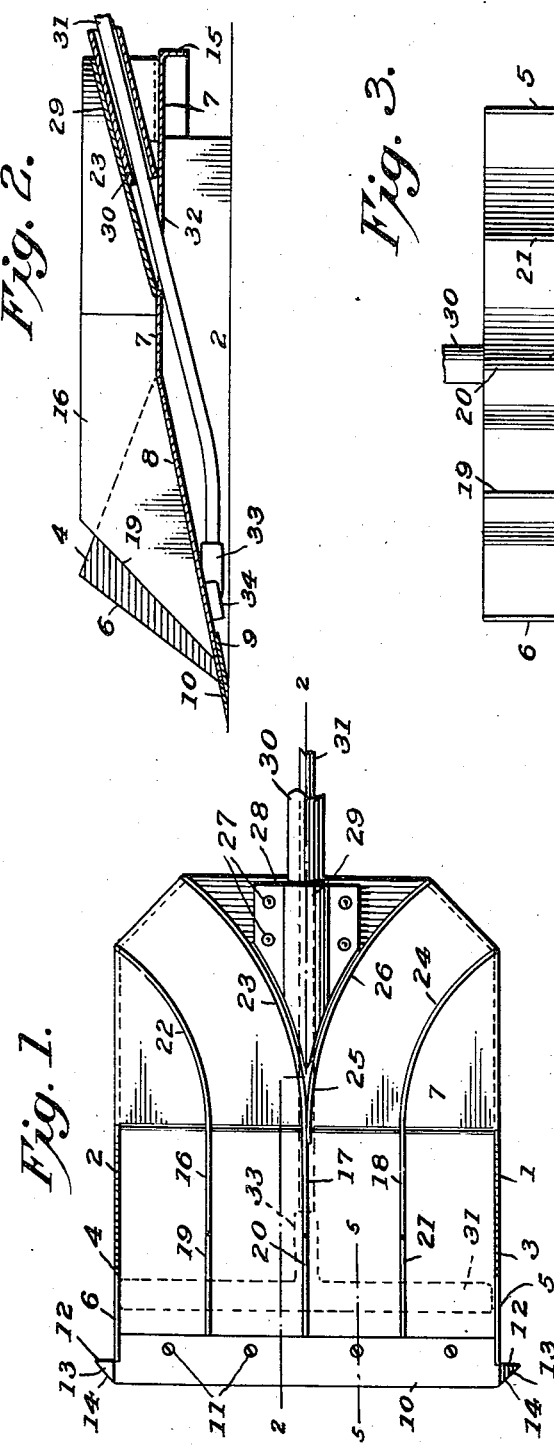
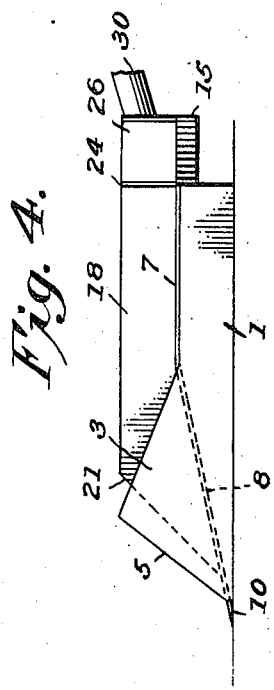
Inventor
Benjamin Thurley.
By Milans & Milans
Attorneys Patented Oct. 29, 1935

2,019,372

UNITED STATES PATENT OFFICE 2,019,372

TOOL FOR REMOVING SLUDGE
OR THE LIKE

Benjamin Thurley, Mobile, Ala.

Application March 25, 1933, Serial No. 662,846

5 Claims. (Cl. 15—236)

My invention relates to new and useful improvements in an implement or tool for removing solidified oil or sludge from tanks or other receptacles either in the shipping or storing of crude oil and more particularly steamship tanks, railway tanks or the like, the principal object of the invention residing in the provision of an implement or tool which will apply a compound to the surface of the receptacle, beneath the coating of solidified oil or sludge, to loosen the coating so that it may be readily removed, the implement or tool being formed with a scraping edge and means whereby the coating will be cut into strips and conveyed and directed to the rear and sides of the implement or tool so that it may be easily removed from the tank in any desired or well-known manner.

Another object of the invention consists in forming an implement or tool of the character described with a detachable cutting edge and vertically extending walls or partitions providing separate and distinct channels, the walls or partitions having cutting edges to cut the coating being removed into strips and the strips being directed into and guided through the channels for deposit into and subsequent removal from the tank.

With the above and other objects in view, which will appear as the description proceeds, my invention consists in the novel details of construction and arrangement of parts described in the following specification and illustrated in the accompanying drawing, and while I have illustrated and described the preferred embodiments of the invention, as they now appear to me, it will be understood that such changes may be made as will fall within the scope of the appended claims.

In the drawing:—

Fig. 1 is a top plan.

Fig. 2 is a longitudinal section on the line 2—2 of Fig. 1.

Fig. 3 is a front elevation.

Fig. 4 is a side elevation; and

Fig. 5 is a fragmental section on the line 5—5 of Fig. 1.

In shipping crude oil in steamship tanks, railway tanks, or the like or in storing the same in receptacles the same hardens and a coating of what is termed sludge gathers on the interior of the tank or receptacle thereby reducing the storage capacity to a considerable extent. My improved form of implement or tool is primarily intended for removing this coating of sludge, it being formed and adapted for delivering a suitable compound to the surface of the receptacle, beneath the coating to loosen the same and to permit the same to be readily scraped or cut from the surface.

My implement or tool consists of the side plates 1 and 2 provided at what may be termed their forward ends with the upwardly extending portions 3 and 4, the forward edges of which are rearwardly inclined as shown at 5 and 6 to provide cutting edges. Secured to the upper edges of the side plates 1 and 2, to the rear of the upwardly extending portions 3 and 4, by welding or in other suitable manner, is a top plate 7 having its forward portion downwardly inclined as shown at 8, this downwardly inclined portion being positioned between the side plates 1 and 2, as shown more particularly in Fig. 4 of the drawing, and secured to these side plates by welding or other suitable manner. Secured to the forward edge of the downwardly extending portion 8, by welding or in other suitable manner, is a strip 9 to which a cutting blade 10 is detachably connected by means of the screws 11 or other suitable means, this cutting blade 10 projecting forwardly of the ends of the side plates 1 and 2, as shown more particularly in Figs. 1, 2 and 4 of the drawing and having at each end a laterally extending projection 12 the upper surfaces of which are beveled as shown at 13 and the forward edges of which are inclined as shown at 14 in Fig. 1 of the drawing. The top plate 7 projects beyond the rear ends of the side plates 1 and 2, as shown more particularly in Fig. 2 of the drawing, and the edge of this projecting portion of the top plate is bent downwardly to provide the strengthening flange 15.

Secured to the upper surface of the top plate 7 and the downwardly extending portion 8 thereof, by welding or in other suitable manner, are the vertically extending partitions 16, 17 and 18, the forward ends of which are downwardly and forwardly inclined as shown at 19, 20 and 21 respectively to provide cutting edges. The rear ends of the partitions 16 and 17 are curved as shown at 22 and 23 towards the end of the side plate 2 whereas the rear end of the partition 18 is curved as shown at 24 towards the end of the side plate 1. Also secured to the upper surface of the plate 7 and to the side of the partition 17, by welding or in other suitable manner, is a vertically extending partition 25 which is curved as shown at 26 on the same arc as the portion 24 of the partition 18. As shown more particularly in Figs. 1 and 3 of the drawing a channel is formed between the partition 18 and the upwardly extending portion 3 of the side plate 1; a channel is formed between the partitions 17 and 18 and the curved portion 24 of the partition 18 and the partition 25 and curved portion thereof; a channel is formed between the partitions 16 and 17 and the curved portions 22 and 23 thereof; and a channel is formed between the partition 16 and the upwardly extending portion 4 of the side plate 2.

Secured to the upper surface of the top plate 7, between the curved portions 23 and 26, by screws 27 or other suitable fastenings, is a plate 28 having the longitudinally extending tubular portion 29 to receive the end of a hollow handle 30. This hollow handle 30 may, if desired, be formed of sections. Extending through the hollow handle is a tube 31, preferably of rubber, this tube or tubing also extending through an opening 32 formed in the top plate 7, as shown more particularly in Fig. 2 of the drawing, with its forward or lower end received in a sleeve or nipple 33 which in turn is secured to or formed as a part of an elongated nozzle extending transversely under the downwardly extending portion 8 of the plate 7, as shown more particularly in Figs. 1, 2 and 5 of the drawing. This nozzle includes the chamber 34 provided along its forward edge with the longitudinally spaced openings 35 which direct the liquid conveyed through the tube 31 towards the forward edge of the cutting blade 10 and beneath the coating of sludge or the like being cut away or removed by the cutting edge. The loosening compound may be supplied to the tube 31 from any suitable or desired source.

From the above detailed description it is thought that the construction will be clearly understood and I will now endeavor to more clearly bring out the mode of operation. In use the side plates 1 and 2 act as runners whereby the implement or tool may be moved over the surface to be cleaned and as it is moved forwardly the cutting blade 10, with the projecting portions 12 on the ends thereof, cut beneath the coating while the loosening compound introduced through the tube 31 and the perforations 35 of the nozzle is directed beneath the cutting blade and under the surface of the coating to loosen the same. As the cutting blade 10 cuts the coating from the surface the cutting edges 5 and 6 of the side plates 1 and 2 respectively, and the cutting edges 19, 20 and 21 of the partitions 16, 17 and 18 respectively cut the removed coating into strips which are conveyed through the channels formed between these side plates and partitions and the partitions direct the strips towards the sides and rear of the implement or tool. Thus the removed coating is separated into relatively narrow strips which are deposited into the tank from which they may be readily removed in any desired manner. Preferably the partitions 16, 17 and 18 are positioned relative to one another and relative to the side plates 1 and 2 to provide channels of approximately four inches in width but the widths of these channels may be increased or decreased, as desired, and any desired number of partitions may be used. From the above it will be seen that I have provided a novel form of implement or tool adapted for the purpose intended and an implement or tool which is relatively simple and inexpensive in construction. I wish to lay particular stress on the fact that the loosening compound is applied directly to the surface of the tank, under the cutting edge of the tool, and preferably the compound is forced through the tubing 31 under air pressure. The cutting blade 10 may be of copper, steel, wood or other suitable material.

Having fully described my invention what I claim as new and desire to secure by Letters Patent is:—

1. A tool of the character described including substantially vertical side plates forming runners, a top plate secured to the side plates and having a downwardly and forwardly directed portion, and a cutting blade secured to the forward edge of the downwardly and forwardly directed portion.

2. A tool of the character described including substantially vertical side plates forming runners, a top plate secured to the side plates and having a downwardly and forwardly directed portion, a cutting blade secured to the forward edge of the downwardly and forwardly directed portion, and vertically extending members having forwardly directed edges secured to the upper surface of the top plate and downwardly and forwardly directed portion.

3. A tool of the character described including substantially vertical side plates forming runners, a top plate secured to the side plates and having a forwardly and downwardly directed portion, said top plate projecting beyond the rear ends of the side plates with its edge portion bent downwardly to form a strengthening flange, and a cutting blade secured to the forward edge of the forwardly and downwardly directed portion of the top plate.

4. A tool of the character described including substantially vertical side plates forming runners, a top plate secured to the side plates and having a forward cutting edge, and vertically extending members secured to the upper surface of the top plate to provide a channel leading from the cutting edge and towards the rear of the plate.

5. A tool of the character described including substantially vertical side plates forming runners, a top plate secured to the side plates and having a forward cutting edge for removing a coating from a surface, and vertically extending members secured to the upper surface of the top plate and forming channels leading from the cutting edge towards the rear of the top plate, the upwardly extending members being formed and adapted to cut the removed coating into strips which are fed through the channels for delivery from the top plate.

BENJAMIN THURLEY.